United States Patent
Onishi et al.

(10) Patent No.: US 11,355,758 B2
(45) Date of Patent: Jun. 7, 2022

(54) CURRENT COLLECTOR FOR LITHIUM ION BATTERY AND MANUFACTURING METHOD OF THE CURRENT COLLECTOR

(71) Applicants: GUNZE LIMITED, Ayabe (JP); APB Corporation, Tokyo (JP)

(72) Inventors: Kazuaki Onishi, Moriyama (JP); Masahiro Uchimaru, Moriyama (JP); Ryosuke Kusano, Kyoto (JP); Sonomi Fukuyama, Kyoto (JP); Shun Kudoh, Kyoto (JP); Yasuhiro Tsudo, Kyoto (JP); Hideaki Horie, Tokyo (JP)

(73) Assignees: GUNZE LIMITED, Ayabe (JP); APB Corporation, Tokyo (JP)

(*) Notice: Subject to any disclaimer, the term of this patent is extended or adjusted under 35 U.S.C. 154(b) by 0 days.

(21) Appl. No.: 17/417,024

(22) PCT Filed: Sep. 3, 2020

(86) PCT No.: PCT/JP2020/033348
§ 371 (c)(1),
(2) Date: Jun. 21, 2021

(87) PCT Pub. No.: WO2021/084900
PCT Pub. Date: May 6, 2021

(65) Prior Publication Data
US 2022/0045333 A1 Feb. 10, 2022

(30) Foreign Application Priority Data
Nov. 1, 2019 (JP) .............................. JP2019-199769

(51) Int. Cl.
*H01M 4/66* (2006.01)
*H01M 4/04* (2006.01)
*H01M 10/0525* (2010.01)

(52) U.S. Cl.
CPC ......... *H01M 4/668* (2013.01); *H01M 4/0433* (2013.01); *H01M 4/661* (2013.01);
(Continued)

(58) Field of Classification Search
CPC .... H01M 4/668; H01M 4/0433; H01M 4/661; H01M 4/663; H01M 4/667; H01M 10/0525
(Continued)

(56) References Cited

U.S. PATENT DOCUMENTS

| | | |
|---|---|---|
| 2017/0237116 A1 | 8/2017 | Shindo et al. |
| 2018/0090766 A1* | 3/2018 | Ohsawa ............... H01M 4/668 |
| 2019/0067680 A1 | 2/2019 | Ohsawa et al. |

FOREIGN PATENT DOCUMENTS

| | | |
|---|---|---|
| JP | 2017-147222 A | 8/2017 |
| JP | 2017-152383 A | 8/2017 |

(Continued)

OTHER PUBLICATIONS

International Search Report in PCT/JP2020/033348, dated Dec. 1, 2020.
(Continued)

*Primary Examiner* — Gary D Harris
(74) *Attorney, Agent, or Firm* — Knobbe, Martens, Olson & Bear, LLP

(57) ABSTRACT

A current collector for a lithium ion battery includes a first conductive resin layer and a second conductive resin layer. The first conductive resin layer includes a first conductive filler. The second conductive resin layer is formed on the first conductive resin layer and includes a second conductive filler. The first conductive filler is a conductive carbon. The second conductive filler contains at least one kind of metal element selected from the group consisting of platinum, gold, silver, copper, nickel, and titanium. A volume % of the
(Continued)

second conductive filler in the second conductive resin layer on a first surface side, which is a first conductive resin layer side, is higher than that on the second surface side that is opposite to the first conductive resin layer.

8 Claims, 2 Drawing Sheets

(52) U.S. Cl.
CPC ........... *H01M 4/663* (2013.01); *H01M 4/667* (2013.01); *H01M 10/0525* (2013.01)

(58) Field of Classification Search
USPC .......................................................... 429/245
See application file for complete search history.

(56) References Cited

FOREIGN PATENT DOCUMENTS

| | | |
|---|---|---|
| JP | 2018-049825 A | 3/2018 |
| JP | 2018-055967 A | 4/2018 |

OTHER PUBLICATIONS

Written Opinion of the International Searching Authority in PCT/JP2020/033348 dated Dec. 1, 2020.

\* cited by examiner

CURRENT COLLECTOR FOR LITHIUM ION BATTERY AND MANUFACTURING METHOD OF THE CURRENT COLLECTOR

TECHNICAL FIELD

The present invention relates to a current collector for a lithium ion battery and a manufacturing method of the current collector.

BACKGROUND ART

JP 2018-55967A (Patent Literature 1) discloses a current collector for a lithium ion battery provided with a first conductive resin layer containing a first conductive filler and a second conductive resin layer containing a second conductive filler. In this current collector for a lithium ion battery, the first conductive filler is a conductive carbon, and the second conductive filler contains at least one kind of metal element selected from the group consisting of platinum, gold, silver, copper, nickel, and titanium. Due to a conductive carbon being used as the first conductive filler, the weight of a current collector for a lithium ion battery can be reduced compared to a case in which a metal element is used as the first conductive filler (see Patent Literature 1).

CITATION LIST

Patent Literature

Patent Literature 1: JP 2018-55967A

SUMMARY OF INVENTION

Technical Problem

However, in a lithium ion battery including the current collector for a lithium ion battery disclosed in the Patent Literature 1, there is a possibility that a resistance value of the second conductive resin layer will increase accompanying heat generation of the first conductive resin layer, and the output of the battery will drop. On the other hand, if the resistance value of the second conductive resin layer is lowered to prepare for an increase in the resistance value that accompanies heat generation of the first conductive resin layer, there is a possibility that a large current will be unintentionally generated in the lithium ion battery.

The present invention was made to solve these problems, and an object of the present invention is to provide a current collector for a lithium ion battery and a manufacturing method of the current collector according to which unintended generation of a large current can be suppressed while suppressing an increase in the resistance value that accompanies heat generation of a first conductive resin layer containing a conductive carbon.

Solution to Problem

A current collector for a lithium ion battery according to an aspect of the present invention includes a first conductive resin layer and a second conductive resin layer. The first conductive resin layer includes a first conductive filler. The second conductive resin layer is formed on the first conductive resin layer and includes a second conductive filler. The first conductive filler is a conductive carbon. The second conductive filler contains at least one kind of metal element selected from the group consisting of platinum, gold, silver, copper, nickel, and titanium. A surface of the first conductive resin layer on a side opposite to the second conductive resin layer is a first surface. A surface of the second conductive resin layer on a side opposite to the first conductive resin layer is a second surface. A volume % of the second conductive filler in the second conductive resin layer on the first conductive resin layer side is higher than that on the second surface side that is opposite to the first conductive resin layer. A specific heat capacity Cp in a 40° C. environment is at least 0.9 mJ/mg·° C. and at most 2.2 mJ/mg·° C., and a surface resistance value of the second surface is at least Ω/□ and at most 2 Ω/□.

In this current collector for a lithium ion battery, the second conductive resin layer contains a larger amount of the second conductive filler on the first conductive resin layer side than on the second surface side. In this current collector for a lithium ion battery, even if the temperature of the first conductive layer increases and the second conductive resin layer expands accompanying an increase in the temperature, since the content of the second conductive filler on the first conductive resin layer side is larger, contact between the second conductive fillers is likely to be maintained. Thus, according to this current collector for a lithium ion battery, an increase in the resistance value of the second conductive resin layer that accompanies an increase in the temperature of the first conductive resin layer can be suppressed.

In addition, in this current collector for a lithium ion battery, even if a high voltage is unintentionally applied, since the content of the second conductive filler on the second surface side (the side opposite to the first conductive resin layer) is small, a large current is not likely to be generated. And thus, according to this current collector for a lithium ion battery, a case in which a large current is unintentionally generated can be suppressed.

This current collector for a lithium ion battery may further include a metal coating layer formed on the second surface.

In this current collector for a lithium ion battery, it is preferable that a metal coating layer is formed on the second surface. According to this current collector for a lithium ion battery, since an active material arranged on the second surface comes into contact with the second conductive filler via the metal coating layer in a larger region, local deterioration of the active material can be suppressed.

In this current collector for a lithium ion battery, it is preferable that a surface resistance value of the first surface is at least 0.9 Ω/□ and at most 8 Ω/□.

In this current collector for a lithium ion battery, it is preferable that a thickness of the first conductive resin layer is 80% or less of a sum of the thickness of the first conductive resin layer and a thickness of the second conductive resin layer.

A manufacturing method of a current collector for a lithium ion battery according to another aspect of the present invention includes a step of forming a first conductive resin layer containing a first conductive filler; and a step of forming a second conductive resin layer containing a second conductive filler, on the first conductive resin layer, in which the first conductive filler is a conductive carbon, the second conductive filler includes at least one kind of metal element selected from the group consisting of platinum, gold, silver, copper, nickel, and titanium, a surface of the first conductive resin layer on a side opposite to the second conductive resin layer is a first surface, a surface of the second conductive resin layer on a side opposite to the first conductive resin layer is a second surface, a volume % of the second conductive filler in the second conductive resin layer on the first conductive resin layer side is higher than that on the second surface side, the manufacturing method further includes a step of controlling a specific heat capacity Cp in a 40° C. environment of the current collector for a lithium ion battery and a surface resistance value of the second surface to target values by adjusting the volume % of the second conductive filler in the second conductive resin layer, the target value of the specific heat capacity is at least 0.9 mJ/mg·° C. and at most 2.2 mJ/mg·° C., and the target value of the surface resistance value of the second surface is at least 1Ω/□ and at most 2 Ω/□.

Advantageous Effects of Invention

According to the present invention, it is possible to provide a current collector for a lithium ion battery and a manufacturing method of the current collector according to which unintended generation of a large current can be suppressed while suppressing an increase in the resistance value that accompanies heat generation of a first conductive resin layer containing a conductive carbon.

DESCRIPTION OF EMBODIMENTS

Figure 1:
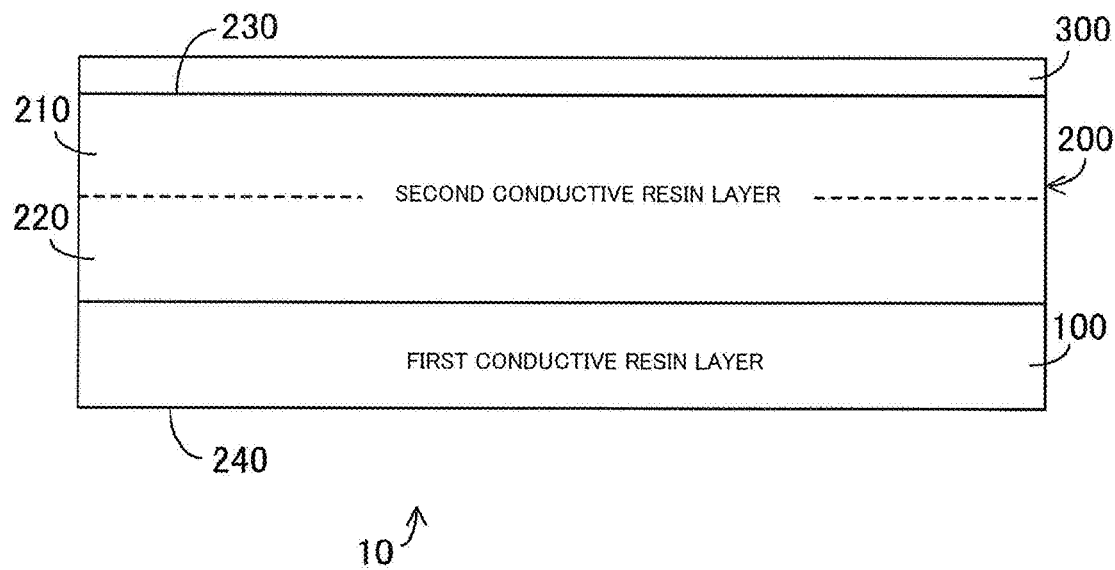
FIG. 1 is a diagram showing a cross-section of a current collector.

The following describes embodiments of the present invention in detail with reference to the drawings. Note that the same or corresponding portions are denoted by the same reference numerals in the drawings, and description thereof will not be repeated.

1. Configuration of Current Collector

FIG. 1 is a diagram showing a cross-section of a current collector 10 according to the present embodiment. The current collector 10 is used as a negative electrode current collector of a lithium ion battery, for example. As shown in FIG. 1, the current collector 10 includes a first conductive resin layer 100, a second conductive resin layer 200, and a metal coating layer 300.

In the lithium ion battery, a negative electrode active material is applied on the upper side of the metal coating layer 300, and a positive electrode current collector is arranged on the lower side of the first conductive resin layer 100. In the lithium ion battery, a current flows in a penetration direction of the current collector 10 (vertical direction in the drawing). Note that the thickness of the first conductive resin layer 100 is 80% or less of the sum of the thickness of the first conductive resin layer 100 and the thickness of the second conductive resin layer 200. The following will describe the layers.

1-1. First Conductive Resin Layer

The first conductive resin layer 100 contains a polyolefin and a conductive filler. In other words, the first conductive resin layer 100 is formed by mixing a polyolefin and a conductive filler.

Examples of polyolefins include polypropylene (PP) and polyethylene (PE). A polymer using a 4 to 30 C α-olefin (e.g., 1-butene, isobutene, 1-hexene, 1-decene, or 1-dodecene) as an essential constituent monomer or the like may also be used as a polyolefin. A single kind or a mixture of two or more kinds of polyolefin may be used.

Among polyolefins, polypropylene is preferable from the viewpoint of moisture-proofing characteristics and mechanical strength. Examples of polypropylene include homopolypropylene, random polypropylene, block polypropylene, a polypropylene having a long-chain branched structure, and an acid-modified polypropylene.

Homopolypropylene is a homopolymer of propylene. Random polypropylene is a copolymer including a small amount (preferably 4.5 wt % or less) of ethylene units that have been irregularly introduced. Block polypropylene is a composition in which ethylene propylene rubber (EPR) is dispersed in homopolypropylene, and has a "sea-island structure" in which "islands" containing EPR float in the "sea" of homopolypropylene. Examples of polypropylene having a long-chain branched structure include polypropylene disclosed in JP 2001-253910A. An acid-modified polypropylene is a polypropylene in which a carboxyl group has been introduced, and can be obtained using a known method such as reacting an unsaturated carboxylic acid such as maleic anhydride with polypropylene in the presence of an organic peroxide.

Examples of the conductive filler contained in the first conductive resin layer 100 include a conductive carbon. Examples of conductive carbons include graphite, carbon black (e.g., acetylene black, ketjen black, furnace black, channel black, and thermal lamp black), carbon nanotubes, and mixtures thereof.

Among the conductive carbons, carbon black is preferable, and acetylene black, furnace black, or a mixture thereof is more preferable. The volume average particle size of carbon black is not particularly limited, but is preferably 3 to 500 nm from the viewpoint of the electrical characteristics of the lithium ion battery in which the current collector 10 is used.

1-2. Second Conductive Resin Layer

The second conductive resin layer 200 is formed on the first conductive resin layer 100, and includes a first surface side layer 220 and a second surface side layer 210. Note that a first surface 240 is a surface of the first conductive resin layer 100 on the side opposite to the second conductive resin layer 200. A second surface 230 is a surface of the second conductive resin layer 200 on the side opposite to the first conductive resin layer 100.

The first surface side layer 220 and the second surface side layer 210 each contain a polyolefin and a conductive filler. In other words, the first surface side layer 220 and the second surface side layer 210 are formed by mixing a polyolefin and a conductive filler. For example, the materials listed in the description of the first conductive resin layer 100 can be used as a polyolefin.

Examples of the conductive filler contained in the second conductive resin layer 200 include platinum, gold, silver, copper, nickel, titanium, and mixtures thereof. That is, the conductive filler contained in the second conductive resin layer 200 includes at least one kind of metal element selected from the group consisting of platinum, gold, silver, copper, nickel, and titanium. Note that, of these, nickel particles are more preferably used as the conductive filler.

In the second conductive resin layer 200, the content of the conductive filler in the first surface side layer 220 is larger than that in the second surface side layer 210. Accordingly, in the current collector 10, even when the temperature of the first conductive resin layer 100 increases and the second conductive resin layer 200 (the first surface side layer 220 that is closer to the first conductive resin layer 100) expands accompanying the increase in temperature, since the volume % of the conductive filler of the first surface side layer 220 is higher, contact between the conductive fillers is likely to be maintained. And thus, according to the current collector 10, an increase in the resistance value of the second conductive resin layer 200 that accompanies the increase in the temperature of the first conductive resin layer 100 can be suppressed.

In addition, for example, even if an object such as a metal piece unintentionally pierces the current collector 10, since the content of the second conductive filler in the second surface side layer 210 is small (the resistance value of the second surface 230 is high), a large current is not likely to be generated. In this manner, according to the current collector 10, a case in which a large current is unintentionally generated can be suppressed.

1-3. Metal Coating Layer

The metal coating layer 300 is formed on the second surface 230 of the second conductive resin layer 200. The metal coating layer 300 is constituted by copper, for example. The metal coating layer 300 is formed using a known technique such as vapor deposition, sputtering, or the like. The thickness of the metal coating layer 300 is not particularly limited, but preferably 10 to 100 nm.

In the current collector 10, the metal coating layer 300 is formed on the second surface 230. Thus, according to the current collector 10, since an active material arranged on the second surface 230 comes into contact with the conductive filler via the metal coating layer 300 in a larger area, local deterioration of the active material can be suppressed.

1-4. Various Parameters

A specific heat capacity Cp of the current collector 10 in a 40° C. environment is at least 0.9 mJ/mg·° C. and at most 2.2 mJ/mg·° C. Measurement of the specific heat capacity Cp is performed using method compliant with JIS-K-7123.

A surface resistance value of the second surface 230 is at least 1Ω/□ and at most 2Ω/□. Measurement of the surface resistance value is performed using a method compliant with JIS-K-7194.

A surface resistance value of the first surface 240 is at least 0.9Ω/□ and at most 8Ω/□. Measurement of the surface resistance value is performed using a method compliant with JIS-K-7194.

Because the specific heat capacity Cp of the current collector 10 and the penetration resistance of the current collector 10 are correlated with each other, when the specific heat capacity Cp in a 40° C. environment is at least 0.9 mJ/mg·° C. and at most 2.2 mJ/mg·° C., and the surface resistance value of the second surface 230 is at least 1Ω/□ and at most 2Ω/□, that means that the internal resistance of the first surface side layer 220 is low to some extent (the first surface side layer 220 contains a large amount of the conductive filler). It has been experimentally found that due to these parameters respectively falling within the above ranges, an increase in the internal resistance of the first surface side layer 220 that accompanies an increase in the temperature of the first conductive resin layer 100 can be suppressed.

2. Manufacturing Method of Current Collector

Figure 2:
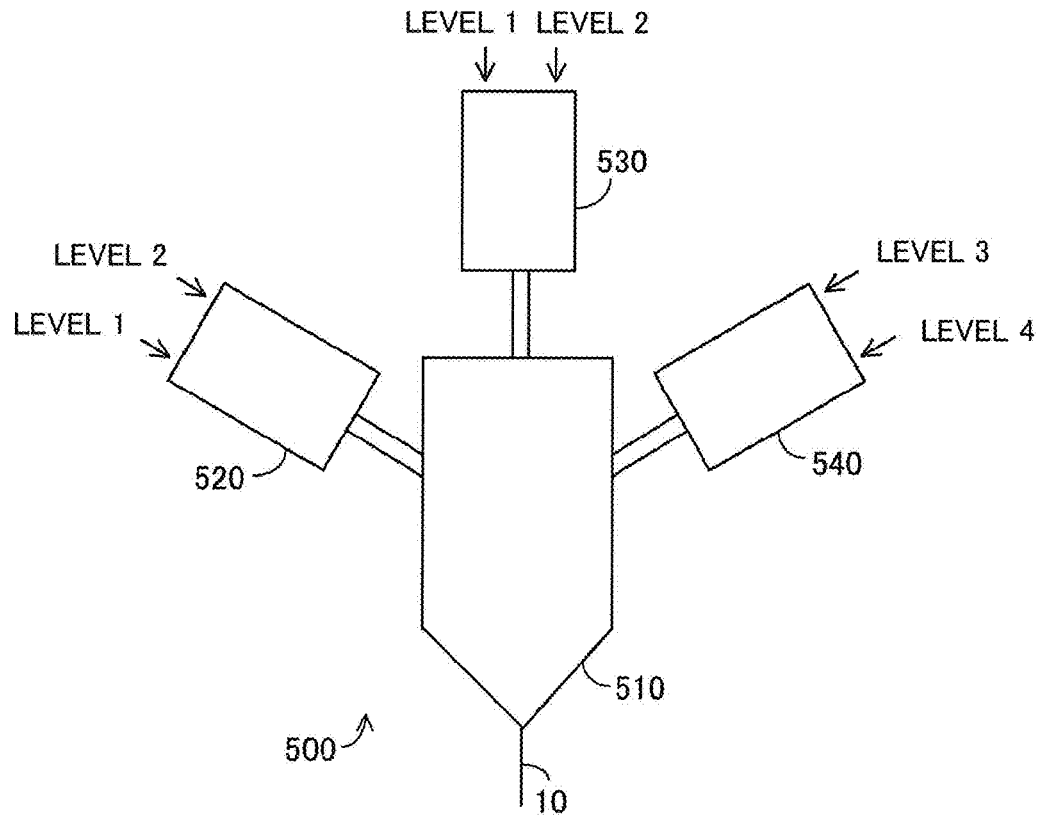
FIG. 2 is a diagram schematically showing a manufacturing device of the current collector.

FIG. 2 is a diagram schematically showing a manufacturing device 500 of the current collector 10. As shown in FIG. 2, the manufacturing device 500 includes a T-die portion 510, and raw material feeding portions 520, 530, and 540.

A conductive resin raw material for forming the second surface side layer 210 of the second conductive resin layer 200 is fed into the raw material feeding portion 520. Specifically, a masterbatch conductive resin raw material having a conductive filler (metal) content at level 1 and a masterbatch conductive resin raw material having a conductive filler content at level 2 are fed. Note that the masterbatch conductive resin raw material at level 2 contains more conductive filler than the masterbatch conductive resin raw material at level 1.

A conductive resin raw material for forming the first surface side layer 220 of the second conductive resin layer 200 is fed into the raw material feeding portion 530. Specifically, a masterbatch conductive resin raw material having a conductive filler (metal) content at level 1 and a masterbatch conductive resin raw material having a conductive filler content at level 2 are fed.

A conductive resin raw material for forming the first conductive resin layer 100 is fed into the raw material feeding portion 540. Specifically, a masterbatch conductive resin raw material having a conductive filler (conductive carbon) content at level 3 and a masterbatch conductive resin raw material having a conductive filler content at level 4 are fed. Note that, the masterbatch conductive resin raw material at level 4 contains more conductive filler than the masterbatch conductive resin raw material at level 3.

The T-die portion 510 is configured such that the raw materials fed via the raw material feeding portions 520, 530, and 540 are extruded together to fuse the fused materials of the conductive resin raw materials together, and thereby a single sheet of film is formed. Specifically, the T-die portion 510 is configured to generate the film-shaped current collector 10 using the raw materials fed via the raw material feeding portions 520, 530, and 540.

Figure 3:
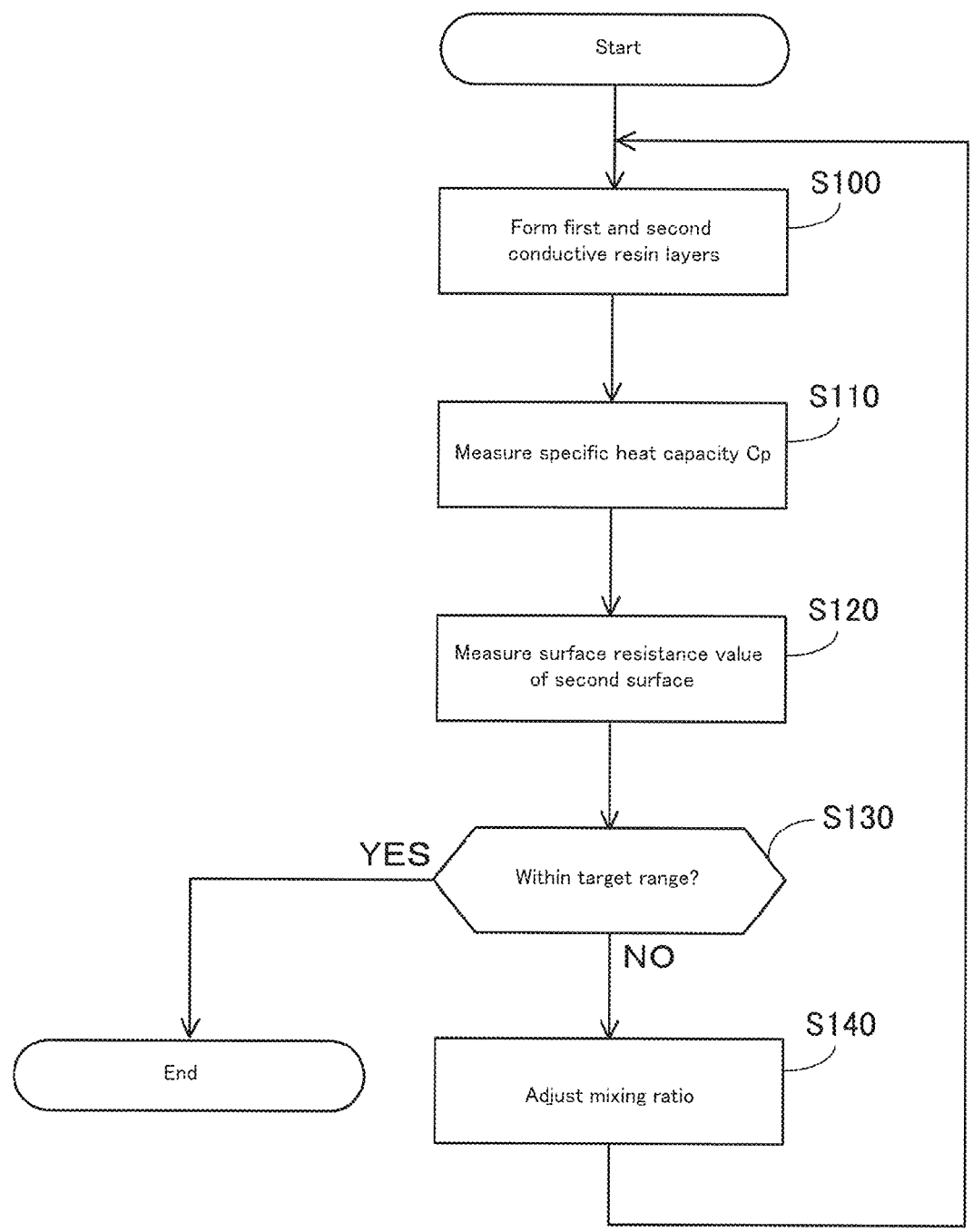
FIG. 3 is a flowchart showing a manufacturing procedure of the current collector.

FIG. 3 is a flowchart showing a manufacturing procedure of the current collector 10. In the manufacturing procedure, first, a provisional first conductive resin layer 100 and a provisional second conductive resin layer 200 are formed at a provisional mixing ratio of the masterbatch conductive resin raw materials, and a provisional current collector 10 (on which the metal coating layer 300 is not formed) is generated. The parameters of the provisional current collector 10 are measured, and the mixing ratio of the masterbatch conductive resin raw materials is adjusted until the parameters fall within the respective target ranges.

With reference to FIG. 3, the manufacturing device 500 forms the provisional first conductive resin layer 100 and the provisional second conductive resin layer 200, and produces the provisional current collector 10 (step S100). Note that the manufacturing device 500 forms the provisional second conductive resin layer 200 such that the content of the conductive filler in the first surface side layer 220 is larger than the content of the conductive filler in the second surface side layer 210.

An operator measures the specific heat capacity Cp of the thus produced provisional current collector 10 (step S110).

The operator measures the surface resistance value of the second surface 230 of the produced provisional current collector 10 (step S120). The operator determines whether the specific heat capacity Cp and the surface resistance value fall within the target ranges (step S130).

The target range of the specific heat capacity Cp of the current collector 10 in a 40° C. environment is at least 0.9 mJ/mg·° C. and at most 2.2 mJ/mg·° C. The target range of the surface resistance value of the second surface 230 is at least 1Ω/□ and at most 2 Ω/□.

When it is determined that the parameters fall within the target ranges (step S130: YES), the operator keeps production of the current collector 10 while maintaining the mixing ratio of the current masterbatch conductive raw materials. The current collector 10, which is produced afterward, is subjected to a step of applying the metal coating layer 300 onto the second surface 230.

On the other hand, if it is determined that the parameters do not fall within the target ranges (step S130: NO), the operator adjusts the mixing ratio of the masterbatch conductive resin raw materials (step S140). The mixing ratio after adjustment may be derived based on experimental rules of the operator, or calculated by a computer. Thereafter, processing of steps S100 to S140 is repeated until the parameters fall within the target ranges. In this manner, the current collector 10 for which the parameters fall within the target ranges is produced.

3. Features

As described above, in the current collector 10, more conductive filler is contained in the first surface side layer 220 of the second conductive resin layer 200 than in the second surface side layer 210. In the current collector 10, even when the temperature of the first conductive resin layer 100 increases and the second conductive resin layer 200 (the first surface side layer 220 that is closer to the first conductive resin layer 100) expands accompanying the increase in the temperature, since the content of the conductive filler in the first surface side layer 220 is larger, contact between the conductive fillers is likely to be maintained. Thus, according to the current collector 10, an increase in the resistance value of the second conductive resin layer 200 that accompanies an increase in the temperature of the first conductive resin layer 100 can be suppressed.

In addition, for example, even if an object such as a metal piece unintentionally pierces the current collector 10, since the content of the conductive filler in the second surface side layer 210 is small, a large current is not likely to be generated. In this manner, according to the current collector 10, a case in which a large current is unintentionally generated can be suppressed.

4. Modified Examples

Although an embodiment was described above, the present invention is not limited to the above-described embodiment, and various changes can be made without departing from the gist of the invention. Hereinafter, modified examples will be described.

In the above embodiment, the metal coating layer 300 was formed on the second surface 230. However, the metal coating layer 300 does not necessarily need to be provided. The metal coating layer 300 does not necessarily need to be formed on the second surface 230.

Also, in the above embodiment, the metal coating layer was not formed on the lower side (on the first surface 240) of the first conductive resin layer 100. However, the metal coating layer may also be formed on the first surface 240. For example, depending on the material (e.g., when a material totally different from the material of the first conductive resin layer 100) forming a positive electrode current collector arranged on the lower side of the first conductive resin layer 100, forming the metal coating layer on the first surface 240 makes it possible to reduce the resistance between the negative electrode and the positive electrode.

5. Working Examples, Etc.

5-1. Working Examples and Comparative Examples

In the description of Working Examples and Comparative Examples, the second surface side layer 210 is referred to as a "layer A", the first surface side layer 220 is referred to as a "layer M", and the first conductive resin layer 100 is referred to as a "layer B". Note that polypropylene resin is contained in the layers A, M, and B, and the melt mass flow rate (MFR) of the polypropylene resin was 13 g/10 min.

5-1-1. Working Example 1

In the current collector in Working Example 1, the total thickness was 50 μm, a copper thin film was formed on the second surface, and nickel (Ni) was used as the conductive filler of the layers A and M. The thickness of the layer A and the layer M was 15 μm, and the content of the conductive filler (volumes) in the layer M was larger than that in the layer A. The conductive filler of the layer B was acetylene black, and the thickness of the layer B was 20 μm. In addition, a copper thin film was formed on the first surface. The specific heat capacity in a 40° C. environment was 1.07 mJ/mg·° C., the surface resistance value of the second surface was 1.45Ω/□, and the surface resistance value of the first surface was 0.9 Ω/□.

5-1-2. Working Example 2

In the current collector in Working Example 2, the total thickness was 50 μm, a copper thin film was formed on the second surface, and nickel (Ni) was used as the conductive filler of the layers A and M. The thickness of the layer A was 20 μm, and the thickness of the layer M was 10 μm. The content of the conductive filler in the layer M was larger than that in the layer A. The conductive filler of the layer B was acetylene black, and the thickness of the layer B was 20 μm. In addition, a copper thin film was formed on the first surface. The specific heat capacity in a 40° C. environment was 1.15 mJ/mg·° C., the surface resistance value of the second surface was 1.49Ω/□, and the surface resistance value of the first surface was 1.07 Ω/□.

5-1-3. Working Example 3

In the current collector in Working Example 3, the total thickness was 50 μm, a copper thin film was formed on the second surface, and nickel (Ni) was used as the conductive filler of the layers A and M. The thickness of the layer A and the layer M was 15 μm, and the content of the conductive filler in the layer M was larger than that in the layer A. The conductive filler of the layer B was acetylene black, and the thickness of the layer B was 20 μm. In addition, a copper thin film was formed on the first surface. The specific heat capacity in a 40° C. environment was 0.92 mJ/mg·° C., the surface resistance value of the second surface was 1.47Ω/□, and the surface resistance value of the first surface was 1.04 Ω/□.

5-1-4. Working Example 4

In the current collector in Working Example 4, the total thickness was 50 μm, a copper thin film was formed on the second surface, and nickel (Ni) was used as the conductive filler of the layers A and M. The thickness of the layer A and the layer M was 15 μm, and the content of the conductive filler in the layer M was larger than that in the layer A. The conductive filler of the layer B was acetylene black, and the thickness of the layer B was 20 μm. In addition, a copper thin film was formed on the first surface. The specific heat capacity in a 40° C. environment was 1.14 mJ/mg·° C., the surface resistance value of the second surface was 1.4Ω/□, and the surface resistance value of the first surface was 10 Ω/□.

5-1-5. Working Example 5

In the current collector in Working Example 5, the total thickness was 50 μm, a copper thin film was formed on the second surface, and nickel (Ni) was used as the conductive filler of the layers A and M. The thickness of the layer A and the layer M was 15 μm, and the content of the conductive filler contained in the layer M was larger than that in the layer A. The conductive filler of the layer B was acetylene black, and the thickness of the layer B was 20 μm. In addition, a copper thin film was formed on the first surface. The specific heat capacity in a 40° C. environment was 2.2 mJ/mg·° C., the surface resistance value of the second surface was 1.5Ω/□, and the surface resistance value of the first surface was 1.07 Ω/□.

5-1-6. Comparative Example 1

In the current collector in Comparative Example 1, the total thickness was 50 μm, a copper thin film was formed on the second surface, and nickel (Ni) was used as the conductive filler of the layers A and M. The thickness of the layer A and the layer M was 15 μm, and the content of the conductive filler contained in the layer A was larger than that in the layer M. The conductive filler of the layer B was acetylene black, and the thickness of the layer B was 20 μm. In addition, a copper thin film was formed on the first surface. The specific heat capacity in a 40° C. environment was 2.4 mJ/mg·° C., the surface resistance value of the second surface was 1.5Ω/□, and the surface resistance value of the first surface was 1.1 Ω/□.

5-1-7. Comparative Example 2

In the current collector in Comparative Example 2, the total thickness was 50 μm, a copper thin film was formed on the second surface, and nickel (Ni) was used as the conductive filler of the layers A and M. The thickness of the layer A and the layer M was 15 μm, and the content of the conductive filler in the layer A was larger than that in the layer M. The conductive filler of the layer B was acetylene black, and the thickness of the layer B was 20 μm. In addition, a copper thin film was formed on the first surface. The specific heat capacity in a 40° C. environment was 2.2 mJ/mg·° C., the surface resistance value of the second surface was less than 0.1 Ω/□, and the surface resistance value of the first surface was 1.1 Ω/□.

5-1-8. Comparative Example 3

In the current collector in Comparative Example 3, the total thickness was 50 μm, a copper thin film was formed on the second surface, and nickel (Ni) was used as the conductive filler of the layers A and M. The thickness of the layer A and the layer M was 15 μm, and the content of the conductive filler in the layer M was larger than that in the layer A. The conductive filler of the layer B was acetylene black, and the thickness of the layer B was 20 μm. In addition, a copper thin film was formed on the first surface. The specific heat capacity in a 40° C. environment was 1.3 mJ/mg·° C., the surface resistance value of the second surface was at least 100Ω/□, and the surface resistance value of the first surface was 1.06 Ω/□.

Table 1, in which Working Examples 1 to 5 and Comparative Examples 1 to 3 are summarized will be shown below.

TABLE 1

| Ident. | Ttl. thk. (μm) | Thin metal film of 2nd surf. | Cond. agent of layer A and M | Thk. of layer A (μm) | Thk. ratio of layer A (%) | Relative comp. b/w cond. agent % of layers A and M | Thk. of layer M (μm) | Thk. ratio of layer M (%) | Cond. agent of 1st surf. | Thk. of layer B (μm) | Thk. ratio of layer B (%) | Thin metal film of 1st surf. | Specific heat capacity Cp at 40° C. (mJ/mg·° C.) | Surf. resist. value of 2nd surf. (Ω/□) | Surf. resist. value of 1st surf. (Ω/□) |
|---|---|---|---|---|---|---|---|---|---|---|---|---|---|---|---|
| Work. Ex. 1 | 50 | Cu | Ni | 15 | 30% | < | 15 | 30% | acetylene black | 20 | 40% | Cu | 1.07 | 1.45 | 0.9 |
| Work. Ex. 2 | 50 | Cu | Ni | 20 | 40% | < | 10 | 20% | acetylene black | 20 | 40% | Cu | 1.15 | 1.49 | 1.07 |
| Work. Ex. 3 | 50 | Cu | Ni | 15 | 30% | < | 15 | 30% | acetylene black | 20 | 40% | Cu | 0.92 | 1.47 | 1.04 |
| Work. Ex. 4 | 50 | Cu | Ni | 15 | 30% | < | 15 | 30% | acetylene black | 20 | 40% | Cu | 1.14 | 1.4 | 10 |
| Work. Ex. 5 | 50 | Cu | Ni | 15 | 30% | < | 15 | 30% | acetylene black | 20 | 40% | Cu | 2.2 | 1.5 | 1.07 |
| Com. Ex. 1 | 50 | Cu | Ni | 15 | 30% | > | 15 | 30% | acetylene black | 20 | 40% | Cu | 2.4 | 1.5 | 1.1 |
| Com. Ex. 2 | 50 | Cu | Ni | 15 | 30% | > | 15 | 30% | acetylene black | 20 | 40% | Cu | 2.2 | <0.1 | 1.1 |

TABLE 1-continued

| Ident. | Ttl. thk. (μm) | Thin metal film of 2nd surf. | Cond. agent of layer A and M | Thk. of layer A (μm) | Thk. ratio of layer A (%) | Relative comp. b/w cond. agent % of layers A and M | Thk. of layer M (μm) | Thk. ratio of layer M (%) | Cond. agent of 1st surf. | Thk. of layer B (μm) | Thk. ratio of layer B (%) | Thin metal film of 1st surf. | Specific heat capacity Cp at 40° C. (mJ/mg·°C.) | Surf. resist. value of 2nd surf. (Ω/□) | Surf. resist. value of 1st surf. (Ω/□) |
|---|---|---|---|---|---|---|---|---|---|---|---|---|---|---|---|
| Com. Ex. 3 | 50 | None | Ni | 15 | 30% | < | 15 | 30% | acetylene black | 20 | 40% | Cu | 1.3 | >100 | 1.06 |

5-2. Evaluation Method

Evaluation was performed with regard to the extent to which the penetration resistance values of the current collectors in the Working Examples and Comparative Examples were influenced by temperature. Specifically, evaluation was performed according to the following procedure with regard to the current collectors in Working Examples and Comparative Examples.

(1) The current collector was allowed to stand still in a thermostatic oven at 40° C. for two minutes, and thereafter the current collector was taken out from the thermostatic oven, and the penetration resistance value was measured. The measurement result was set as a 40° C. resistance value. The method for measuring the penetration resistance value will be described in detail later.

(2) The current collector was allowed to stand still in a thermostatic oven at 80° C. for two minutes, and thereafter the current collector was taken out from the thermostatic oven, and the penetration resistance value was measured. The measurement result was set as an 80° C. resistance value.

(3) The samples for which the temperature influence coefficient calculated using the following equation is less than 0.02 ($\Omega \cdot cm^2$/° C.) are not likely to be influenced by temperature, and were thus evaluated as "good". The samples for which the temperature influence coefficient is 0.02 ($\Omega \cdot cm^2$/° C.) or more are likely to be influenced by temperature, and were thus evaluated as "bad".

Temperature influence coefficient ($\Omega \cdot cm^2$/° C.)=(80° C. resistance value ($\Omega \cdot cm^2$)−40° C. resistance value ($\Omega \cdot cm^2$)/(80(° C.)−40(° C.))

Note that the penetration resistance value was measured using the following method. A 7 cm×7 cm sample is cut and taken out of each of the current collectors, and the resistance value in the thickness direction (penetration direction) of the current collector was measured using an electrical resistance measuring device [IMC-0240 type, manufactured by Imoto Machinery Co., Ltd.] and a resistance meter [RM3548, manufactured by HIOKI]. The resistance value of each current collector was measured in a state in which a load of 2.16 kg has been placed on the electrical resistance measurement instrument, and the value after 60 seconds after the load is placed was taken as the resistance value of the current collector. As shown in the following expression, a value obtained by multiplying the surface area (3.14 $cm^2$) of a contact surface of a jig at the time of measuring the resistance value is taken as the penetration resistance value ($\Omega \cdot cm^2$).

Penetration resistance value ($\Omega \cdot cm^2$)=Resistance value ($\Omega$)×3.14($cm^2$)

5-3. Evaluation Results

As results of the above evaluation, Working Examples 1 to 5 were evaluated as "good", and Comparative examples 1-3 were evaluated as "bad".

LIST OF REFERENCE NUMERALS

10 Current collector
100 First conductive resin layer
200 Second conductive resin layer
210 Second surface side layer
220 First surface side layer
230 Second surface
240 First surface
300 Metal coating layer
500 Manufacturing device
510 T-die
520, 530, 540 Raw material feeding portion

The invention claimed is:

1. A current collector for a lithium ion battery comprising:
a first conductive resin layer containing a first conductive filler; and
a second conductive resin layer that is formed on the first conductive resin layer and contains a second conductive filler,
wherein the first conductive filler is a conductive carbon,
the second conductive filler contains at least one kind of metal element selected from the group consisting of platinum, gold, silver, copper, nickel, and titanium,
a surface of the first conductive resin layer on a side opposite to the second conductive resin layer is a first surface,
a surface of the second conductive resin layer on a side opposite to the first conductive resin layer is a second surface,
a volume % of the second conductive filler in the second conductive resin layer on the first conductive resin layer side is higher than that on the second surface side,
a specific heat capacity Cp in a 40° C. environment is at least 0.9 mJ/mg·° C. and at most 2.2 mJ/mg·° C., and
a surface resistance value of the second surface is at least 1Ω/□ and at most 2 Ω/□.

2. The current collector for a lithium ion battery according to claim 1, further comprising a metal coating layer formed on the second surface.

3. The current collector for a lithium ion battery according to claim 1, wherein a surface resistance value of the first surface is at least 0.9Ω/□ and at most 8 Ω/□.

4. The current collector for a lithium ion battery according to claim 1, wherein a thickness of the first conductive resin layer is 80% or less of a sum of the thickness of the first conductive resin layer and a thickness of the second conductive resin layer.

5. A manufacturing method of a current collector for a lithium ion battery, comprising:
- a step of forming a first conductive resin layer containing a first conductive filler; and
- a step of forming a second conductive resin layer containing a second conductive filler, on the first conductive resin layer, wherein the first conductive filler is a conductive carbon,
the second conductive filler includes at least one kind of metal element selected from the group consisting of platinum, gold, silver, copper, nickel, and titanium,
a surface of the first conductive resin layer on a side opposite to the second conductive resin layer is a first surface,
a surface of the second conductive resin layer on a side opposite to the first conductive resin layer is a second surface,
a volume % of the second conductive filler in the second conductive resin layer on the first conductive resin layer side is higher than that on the second surface side,
the manufacturing method further comprises a step of controlling a specific heat capacity Cp in a 40° C. environment of the current collector for a lithium ion battery and a surface resistance value of the second surface to target values by adjusting the volume % of the second conductive filler in the second conductive resin layer,
the target value of the specific heat capacity is at least 0.9 mJ/mg·° C. and at most 2.2 mJ/mg·° C., and
the target value of the surface resistance value of the second surface is at least 1Ω/□ and at most 2 Ω/□.

6. The current collector for a lithium ion battery according to claim 2, wherein a surface resistance value of the first surface is at least 0.9Ω/□ and at most 8 Ω/□.

7. The current collector for a lithium ion battery according to claim 2, wherein a thickness of the first conductive resin layer is 80% or less of a sum of the thickness of the first conductive resin layer and a thickness of the second conductive resin layer.

8. The current collector for a lithium ion battery according to claim 3, wherein a thickness of the first conductive resin layer is 80% or less of a sum of the thickness of the first conductive resin layer and a thickness of the second conductive resin layer.

* * * * *